United States Patent
Lim et al.

(10) Patent No.: US 11,638,235 B2
(45) Date of Patent: Apr. 25, 2023

(54) INDICATING PROPERTIES OF A USER EQUIPMENT TO A NETWORK CONTROL NODE

(71) Applicant: Alcatel Lucent, Boulogne-Billancourt (FR)

(72) Inventors: Seau Sian Lim, Swindon (GB); Sudeep Palat, Chippenham (GB); Shin Horng Wong, Chippenham (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/112,281

(22) PCT Filed: Jan. 14, 2015

(86) PCT No.: PCT/EP2015/050596
§ 371 (c)(1),
(2) Date: Jul. 18, 2016

(87) PCT Pub. No.: WO2015/113817
PCT Pub. Date: Aug. 6, 2015

(65) Prior Publication Data
US 2016/0338005 A1     Nov. 17, 2016

(30) Foreign Application Priority Data
Jan. 30, 2014  (EP) .................................. 14305124

(51) Int. Cl.
*H04W 68/02*  (2009.01)
*H04W 8/22*  (2009.01)
(Continued)

(52) U.S. Cl.
CPC .............. *H04W 68/02* (2013.01); *H04W 4/70* (2018.02); *H04W 8/22* (2013.01); *H04W 76/27* (2018.02); *H04W 88/02* (2013.01)

(58) Field of Classification Search
CPC ..... H04W 68/02; H04W 8/22; H04W 74/046; H04W 88/02
See application file for complete search history.

(56) References Cited

U.S. PATENT DOCUMENTS

| 2013/0083753 A1 | 4/2013 | Lee et al. |
| 2013/0136072 A1* | 5/2013 | Bachmann .............. H04W 4/70 370/329 |

(Continued)

FOREIGN PATENT DOCUMENTS

| CN | 102158959 A | 8/2011 |
| CN | 102387495 A | 3/2012 |

(Continued)

OTHER PUBLICATIONS

International Search Report PCT/ISA/210 for International Application No. PCT/EP2015/050596 dated Mar. 17, 2015.
(Continued)

*Primary Examiner* — Muthuswamy G Manoharan
(74) *Attorney, Agent, or Firm* — Harness, Dickey & Pierce, P.L.C.

(57) ABSTRACT

A method, computer program, network control node, user equipment and base station are disclosed which allow a wireless communication network to support different types of user equipment which have particular signalling requirements. In particular, low complexity devices that require signals having low transport block sizes and those that require a coverage enhanced mode where messages are repeated are supported. Information regarding their particular capabilities are transmitted to and stored in the network control node which then transmits this information as paging information with any paging request.

12 Claims, 3 Drawing Sheets

(51) Int. Cl.
*H04W 4/70* (2018.01)
*H04W 76/27* (2018.01)
*H04W 88/02* (2009.01)

(56) References Cited

U.S. PATENT DOCUMENTS

| | | | | | |
|---|---|---|---|---|---|
| 2014/0086173 | A1* | 3/2014 | Sadeghi | ............... | H04L 5/005 370/329 |
| 2014/0098761 | A1* | 4/2014 | Lee | ............... | H04W 72/005 370/329 |
| 2014/0126549 | A1* | 5/2014 | Beale | ............... | H04W 16/08 370/336 |
| 2014/0307621 | A1* | 10/2014 | Frenger | ............... | H04W 4/70 370/328 |
| 2015/0365914 | A1* | 12/2015 | Yu | ............... | H04W 68/02 455/458 |
| 2016/0205659 | A1* | 7/2016 | Bergman | ............... | H04L 1/1812 370/252 |

FOREIGN PATENT DOCUMENTS

| | | |
|---|---|---|
| CN | 103460788 A | 12/2013 |
| WO | WO-2013049768 A1 | 4/2013 |
| WO | WO-2013/174297 A1 | 11/2013 |
| WO | WO-2015/026285 A2 | 2/2015 |

OTHER PUBLICATIONS

Written Opinion of the International Searching Authority PCT/ISA/237 for International Application No. PCT/EP2015/050596 dated Mar. 17, 2015.

Ericsson: "Impact of Reduced Transport Block Size on Low cost MTC UE in LTE", No. San Francisco, CA, US; Nov. 11, 2013-Nov. 15, 2013, Nov. 12, 2013 (Nov. 12, 2013), XP050739473, Retrieved from the Internet <URL:http://www.3gpp.org/ftp/Meetings_3GPP_SYNC/RAN/RAN4/Docs/> [retrieved on Nov. 12, 2013].

Mediatek Inc: "Impact of Introducing Low-Cost MTC UE on RAN2", No. San Francisco, USA; Nov. 11, 2013-Nov. 15, 2013, Nov. 13, 2013 (Nov. 13, 2013), XP050736878, Retrieved from the Internet <URL:http://www.3gpp.org/ftp/Meetings_3GPP_SYNC/RAN/RAN2/Docs/> [retrieved on Nov. 13, 2013].

<HTML><META HTTP-EQUIV="content-type" Content="text/html;charset=utf-8"> ZTE: "Remaining details of new UE category for low cost MTC", No. San Francisco, USA; Nov. 11, 2013-Nov. 15, 2013, Nov. 13, 2013 (Nov. 13, 2013), XP050735039, Retrieved from the Internet <URL:http://www.3gpp.org/ftp/Meetings_3GPP_SYNC/RAN/RAN1/Docs/> [retrieved on Nov. 13, 2013].

3GPP2 Draft: No. v1.0, Dec. 10, 2010 (Dec. 10, 2010), pp. 1-31, XP062092032, Retrieved from the Internet <URL:http://ftp.3gpp2.org/TSGS/Working/_2010/2010-12-Oahu/TSG-S-2010-12-Waikiki/Plenary/> [retrieved on Dec. 10, 2010].

Brief Summary of Notice of Preliminary Rejection dated Jul. 19, 2017 issued in corresponding Korean Application No. 10-2016-7023811.

ZTE, "Remaining details of new UE category for low cost MTC," R1-135356, pp. 1-4 (2013).

Ericsson. "Analysis and way forward of UE-specific SON". 3GPP TSG-RAN WG3#79. R3-130255. Malta, Jan. 28-Feb. 1, 2013.

Intel Corporation, R1-134128: "New UE category/type for low cost MTC," 3GPP TS G-RAN WG1 #74b, 3GPP TSG-RAN WG1, Section 2.3, pp. 1-8 (2013).

Alcatel-Lucent, Alcatel-Lucent Shanghai Bell "Paging for MTC UEs operating in coverage enhancement mode," 3GPP TSG-RAN WG1 Meeting #74bis, pp. 1-2 (2013).

European Examination Report dated Jan. 23, 2020 issued in corresponding European Patent Application No. 14 305 124.1.

Chinese Office Action dated Sep. 29, 2019 for CN Application No. 201580006611 (no English translation).

European Search Report dated Oct. 28, 2021 issued in corresponding European Patent Application No. 14 305 124.1-1231.

European Examination Report dated Nov. 20, 2020 issued in European Patent Application No. 14 305 124.1-1231.

European Office Action dated Sep. 28, 2022 issue in European Patent Application No. 14 305 124.1-1215.

\* cited by examiner

Two methods of providing explicity the LC MTC and/or enhanced coverage mode capability The LC MTC capability and enhanced coverage mode capability is provided in a separate RRC Container to the existing RRC Container for use in Idle mode paging

INDICATING PROPERTIES OF A USER EQUIPMENT TO A NETWORK CONTROL NODE

CROSS-REFERENCE TO RELATED APPLICATIONS

This is a National Phase of PCT Patent Application No. PCT/EP2015/050596 filed on Jan. 14, 2015, and claims priority to, European Application No. 14305124.1, filed Jan. 30, 2014, the contents of each of which are hereby incorporated by reference in their entirety.

FIELD OF THE INVENTION

The present invention relates to wireless communication networks and in particular, to paging user equipment that is in idle mode and not currently connected to the network.

BACKGROUND

Wireless telecommunications systems are known. In a cellular system, radio coverage is provided to user equipment, for example, mobile phones, in areas known as cells. A base station is located in each cell to provide radio coverage. User equipment in each cell receives information and data from a base station and can be operable to transmit information and data to the base station.

Information and data transmitted by a base station to user equipment occurs on channels of radio carriers known as downlink channels. Information and data transmitted by user equipment to the base station occurs on channels of radio carriers known as uplink channels. Although the deployment of base stations is largely controlled or controllable by a network operator, the deployment of user equipment is not. The deployment of user equipment within a network can cause unexpected consequences.

Wireless communication networks are increasingly being used for the transmission of information other than voice calls. It may therefore be desirable to specify a new type of user equipment UE and/or a new type of communication mode that have some different features to those of conventional mobile telephones. In order to support such UEs, the network node, or base station needs to know the UE capability. For connected mode UEs, it is not a problem as UE capability can be exchanged via dedicated signalling or from the core network. The main issues arises before the UE is connected (i.e. when it is in idle mode).

It would be desirable to be able to support different types and modes of operation of user equipment while still being able to successfully transmit paging information to the user equipment.

SUMMARY

A first aspect of the present invention provides a method of sending paging instructions to a user equipment from a network control node of a wireless communication network, radio coverage for said wireless communication network being provided in a plurality of cells by a plurality of base stations: receiving at said network control node at least one of: low complexity identification information identifying said user equipment as a low complexity user equipment; an indication as to whether said user equipment supports a coverage enhanced mode; and an indication as to whether said user equipment supporting said coverage enhanced mode is currently in an area requiring said coverage enhanced mode, said coverage enhanced mode utilising repetition of some messaging to increase coverage; storing said at least one of said low complexity user equipment information and said coverage enhanced mode indications as paging property information for said user equipment at said network control node; transmitting said paging property information to at least one of said base stations when instructing paging of said user equipment that is currently in idle mode.

Inventors of the present invention recognised that wireless communication networks are being used for different devices in addition to conventional mobile telephones. One relatively new type of device that uses such networks is a machine type communication MTC device that is used for the communication of information from machines, for example from smart utility meters. Such devices may not access the network very often and may only send a limited amount of data when they do. Thus, it may be advantageous to specify a new simpler type of user equipment for such operation termed, low complexity or low cost MTC devices. The reduction of cost comes about by limiting the capability of the LC MTC UE, for example, by limiting the transport block size for uplink and downlink transmissions, allowing a reduced buffer size to be used within the device.

A further feature of such devices is that they are often not mobile and may be located in areas of high signal attenuation such as a basement making communication between a network node and the device difficult. An enhanced coverage communication mode has been devised to address this, wherein during an enhanced coverage mode of operation certain messages are sent repeatedly allowing the information to be accumulated and decoded. Thus, high attenuation areas of the cell are areas that require the enhanced coverage mode of operation to improve the probability of successful communication.

In order to be able to transmit paging information to such devices when they are in idle mode the network needs to be aware of their capabilities such that the paging message can be sent in a form that the user equipment can decode.

This problem is addressed by a network control node which is a node of the core network such as a mobility management entity or MME node in LTE networks receiving information about the capabilities of the user equipment and storing it as paging property information for that user equipment. Then when the network control node instructs paging, it transmits the paging property information with the paging instructions to the base station which can then use appropriate signalling when paging the user equipment. In this way different types of user equipment can be supported by the network and yet can still be successfully paged.

It should be noted that information regarding the enhanced coverage mode, may comprise two indicators, one indicating the capability of the user equipment to support a coverage enhanced mode and the other indicating whether it is in an area that currently has a coverage enhanced mode capability. Alternatively, this information may be sent as a single indicator simply indicating that the mode is currently supported. In this regard for paging purposes the latter is all that is required, however, the capability and mode of the user equipment may be transmitted in different ways and thus, these two aspects may be indicated separately.

In some embodiments, the method comprises receiving both of said low complexity identification information and said coverage enhanced mode indications and storing said low complexity identification information and said coverage enhanced mode indications as said paging property information.

The network may be configured to support either low complexity user equipment or coverage enhanced mode user equipment and in either case paging property information needs to be available to the core network at the network control node, such that it can be transmitted to the base stations when instructing paging of the user equipment. In some embodiments, both coverage enhanced mode and low complexity user equipment are supported by the network, in which case the paging property information can include one or both of these features depending on the UE and its current location. As noted above the coverage enhanced mode indicator may be a single indicator indicating that the user equipment is both coverage enhanced capable and in an area requiring this mode, or it may be two indicators one indicating the user equipment capability and the other indicative of whether the mode is currently required or not.

In some embodiments, said coverage enhanced mode indication is received as non-access stratum (NAS) signalling in some embodiments within a tracking area update signal.

Where the user equipment can support coverage enhanced mode, it may not always support this mode but may operate in a coverage enhanced mode when it is an area of high attenuation, and yet operate in standard non coverage enhanced mode when it is in an area with a stronger signal. Thus, where the device is mobile it may move into and out of these areas and therefore switch from coverage enhanced mode to non coverage enhanced mode. In such a case, the changes in its capabilities need to be transmitted to the core network such that the paging information is sent in the appropriate form and the user equipment is able to receive it. A convenient way of doing this is by the use of tracking area updates. Tracking area update signals are used by a user equipment when it is in idle mode to provide the core network with updated location information so that paging messages can be sent to the appropriate base station. Thus, such communication networks already have this capability and embodiments of the present invention use this capability such that, not just when moving between cells but also when moving in and out of coverage enhanced areas, the user equipment can trigger a tracking area update process use it to provide the change in enhanced coverage mode to the network control node, with or without other tracking area change information, such as moving between cells.

A further example of a non access stratum (NAS) signal is an attach signal that is transmitted from the user equipment to the network control node on initial connection to the network. In this regard, when initially switching on or arriving in a new area a user equipment will locate an appropriate network and will transmit a non access stratum signal registering itself with that network, such that it can later connect to the network and receive paging messages and any network updates. It can provide this additional paging property information within this signal and this can be stored in the network control node and transmitted to the base station as paging information when paging is required.

In some embodiments, at least some of said paging property information is received from said user equipment as part of radio resource control RRC signalling.

When the user equipment performs the RRC connection establishment procedure it will provide its capability and mode of operation via an RRC message to the base station. The base station can extract this particular capability and provide it to the network control node. In this regard, when connecting to a network the capabilities of the user equipment are transmitted to the network control node via the base station in a "container" such that as it moves cells this information can be forwarded to the base station of the next cell. In this case, the paging information which may include both capability and mode of operation is extracted and sent separately in a different "container" to the other information regarding the UE to the network control node. This is because the network control node needs to access this information when instructing paging when the user equipment is in idle mode as opposed to simply transmitting the information to a next base station when the device moves cells when the device is in active mode.

In some embodiments, a least one of said low complexity identification information and said enhanced mode coverage capability is received from subscription information for said user equipment on registration of said user equipment with said network.

The low complexity information of a user equipment and/or its capability to support enhanced coverage mode will be part of the subscription information for the user equipment with a network. Thus, in some embodiments the network control node will receive it on registration of the user equipment with that network.

In some embodiments, said step of transmitting said paging property information is performed when sending paging from said network control node to at least one of said base stations.

The paging property information may be transmitted to the base stations from the core network using an S1 paging signal which is a signal that is sent between the core network and the base station when the core network needs to page a UE.

A second aspect of the present invention provides a network control node for a wireless communication network radio coverage for said wireless communication network being provided in a plurality of cells by a plurality of base stations, said network control node being operable to send paging instructions to a user equipment and comprising: a receiver operable to receive at least one of: low complexity identification information identifying said user equipment as a low complexity user equipment; an indication as to whether said user equipment supports a coverage enhanced mode; and an indication as to whether said user equipment supporting said coverage enhanced mode is currently in an area requiring said coverage enhanced mode, said coverage enhanced mode utilising repetition of some messaging to increase coverage; a data store operable to store said received at least one of said low complexity user equipment information and said coverage enhanced mode indication as paging property information for said user equipment; a transmitter operable to transmit said paging property information to at least one of said base stations when instructing paging of said user equipment that is currently in idle mode.

A third aspect of the present invention provides a method performed by user equipment communicating with a wireless network, said user equipment being configured to transmit to a network control node on connection to said network at least one of: low complexity identification information identifying said user equipment as a low complexity user equipment, an indication as to whether said user equipment supports a coverage enhanced mode and an indication as to whether said user equipment is currently in an area requiring said coverage enhanced mode, said coverage enhanced mode utilising repetition of some messaging to increase coverage.

As indicated previously, in order for these new types of user equipment to be supported by the network they need to transmit their capabilities and/or mode to a network control node which controls paging to these devices. Thus, such user equipment is configured on connection to the network to transmit this information to the network control node where it can be centrally stored and used in the paging procedure.

A fourth aspect of the present invention provides a user equipment for communicating with a wireless network, said user equipment being configured to transmit to a network control node on connection to said network at least one of: low complexity identification information identifying said user equipment as a low complexity user equipment, an indication as to whether said user equipment supports a coverage enhanced mode and an indication as to whether said user equipment supporting said coverage enhanced mode is currently in an area requiring said coverage enhanced mode, said coverage enhanced mode utilising repetition of some messaging to increase coverage.

In some embodiments, said user equipment supporting said coverage enhanced mode and being configured to detect a change in said coverage enhanced mode capability and to respond to said detected change by triggering a tracking area update procedure and to transmit said change in said coverage enhanced mode indication within a tracking area update signal.

Where the user equipment supports coverage enhanced mode and is mobile, then it needs to signal to the network when it is operating in coverage enhanced mode and when it is not. Thus, it is configured to detect when it moves into and out of areas where such a mode is both supported and required and in response to detecting a change, to trigger a tracking area update procedure such that this information can be notified to the network control node in the same way that it notifies information to the network control node when it moves between cells. In this way, a procedure that is already in place can be used to allow their support or otherwise of the coverage enhanced mode to be tracked.

In some embodiments, said user equipment is configured to transmit at least one of said low complexity identification information and said coverage enhanced mode indication as at least one of: part of a radio resource control signal and a non access stratum (NAS) signal (such as an attach request or a tracking area update signal) transmitted from said user equipment to said network control node.

When user equipment transmits a signal to the network control node it may use radio resource control signalling directed to a base station which will forward information to the network control node, or a non access stratum signal directed to the network control node and sent transparently through a base station, to convey this information.

A fifth aspect of the present invention provides a method performed by a base station of receiving paging instructions from a network control node, said paging instructions instructing paging of a user equipment and comprising paging property information indicating said user equipment to be at least one of a low complexity user equipment, a user equipment that supports a coverage enhanced mode and a user equipment that is currently in an area requiring said coverage enhanced mode; said base station being configured to respond to said received paging instructions by transmitting a paging message to said user equipment; and where said paging property information indicates said user equipment to be low complexity user equipment said paging message being transmitted in transport blocks of less than a predetermined size; and where said paging property information indicates said user equipment to support a coverage enhanced mode and be in an area requiring said coverage enhanced mode to repeatedly transmit said paging message to said user equipment.

In order for base stations to operate in a system that supports different types of user equipment they need to know when they receive paging instructions the properties of the user equipment they are to page. Thus, they are configured to receive the paging information when they receive the paging message instructions and to page the user equipment in the appropriate way. Thus, if the paging property information indicates low complexity user equipment the paging message will be transmitted in smaller transport blocks, whilst if it indicates coverage enhanced mode then the paging message will be repeatedly transmitted to the user equipment.

A sixth aspect of the present invention provides a base station configured to receive paging instructions from a network control node, said paging instructions instructing paging of a user equipment and comprising paging property information indicating said user equipment to be at least one of a low complexity user equipment, a user equipment that supports a coverage enhanced mode and a user equipment that is currently in an area requiring said coverage enhanced mode; said base station being configured to respond to said received paging instructions by transmitting a paging message to said user equipment; and where said paging property information indicates said user equipment to be low complexity user equipment said paging message being transmitted in transport blocks of less than a predetermined size; and where said paging property information indicates said user equipment to support a coverage enhanced mode and be in an area requiring said coverage enhanced mode to repeatedly transmit said paging message to said user equipment.

A seventh aspect of the present invention provides a computer program operable to control a computer to perform a method according to a first, third or fifth aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
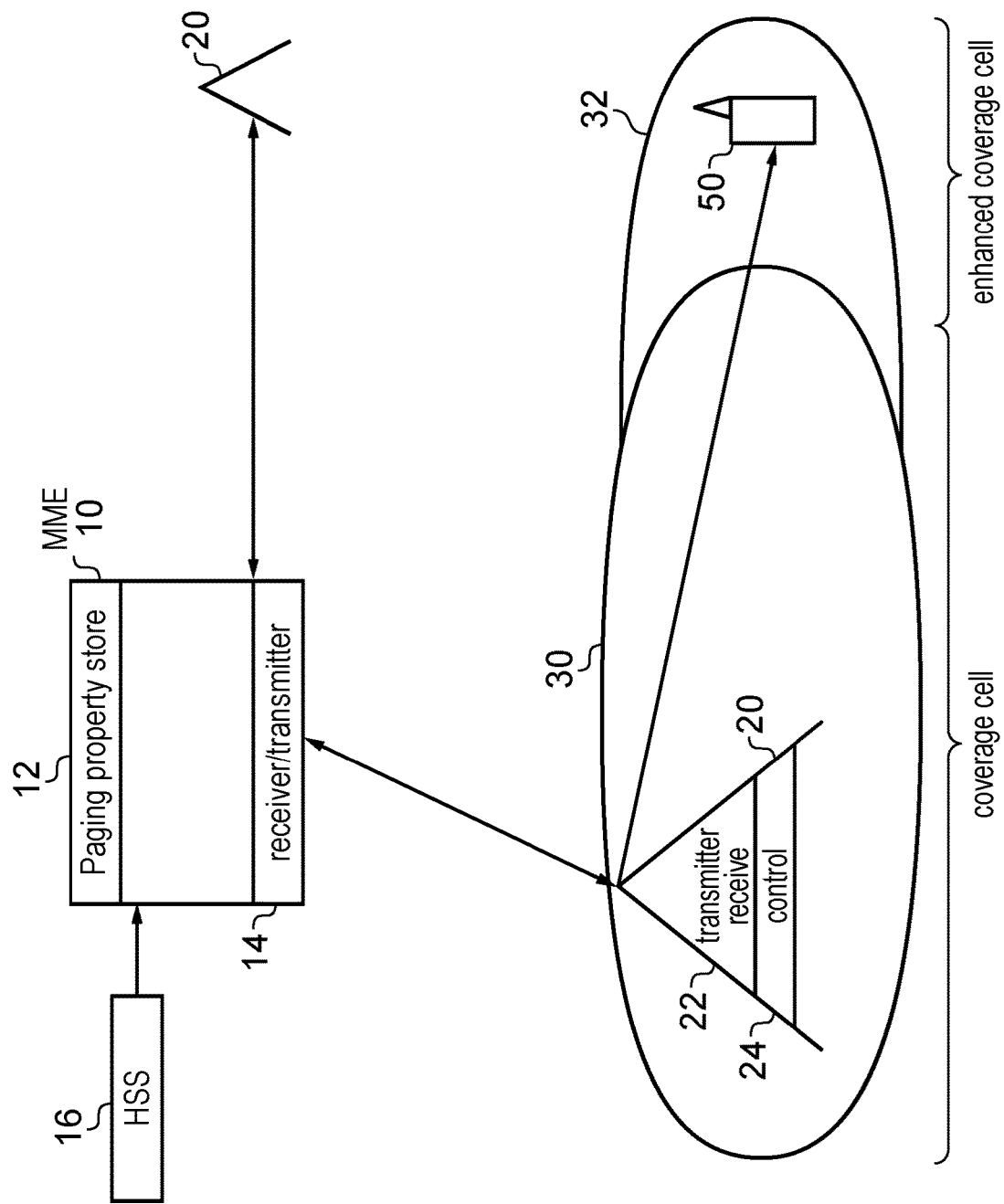
FIG. 1 shows a wireless network communication system according to an embodiment of the present invention.

Before discussing the embodiments in any more detail, first an overview will be provided. The application addresses the problem of providing the information that the UE is LC MTC and/or in coverage enhanced mode to the network/eNB prior to idle mode paging.

It recognises that the following options are available to it to provide such information:

a. When the UE performs NAS attached or tracking area updates
b. As part of the UE subscription
c. A combination of (a) and (b)

With regard to option (a), there are 3 different ways of providing LC MTC capability and coverage enhanced mode capability from the UE when it is not connected:

Method 1: Explicit Capability Indication Via NAS Message

This can occur when the UE first switches on. It provides the LC MTC capability to the network via the NAS Attach and this is kept as part of the UE context at the network control node or MME for LTE networks. If the UE detects during switch-on that it is in enhanced coverage cell/tracking area, it will also indicate this to the network. The LC MTC capability of an UE is a static capability of the UE which will not change. It may also indicate if it has enhanced coverage capability. The use of enhanced coverage mode depends on whether the UE is in an enhanced coverage area and may change if the UE is moved. The UE can provide the change in enhanced coverage mode in tracking area updates (with or without tracking area change); i.e., when the capability changes, the UE will trigger a TAU procedure. The MME stores the capability while the UE is attached to the network. When the UE is in idle mode and the MME needs to page the UE, the MME provides the eNB during S1 paging signalling with explicit IEs on the LC MTC capability of the UE and/or coverage enhanced mode. The eNB then performs according to the capability.

Method 2: Explicit Capability Indication Via RRC Message

When the UE performs RRC Connection establishment for the first time, it will provide its capability via an RRC message. Instead of keeping the capability in the existing UE capability container, the UE can provide the LC MTC and/or enhanced coverage capability and mode as an explicit signalling to the MME. The MME stores this information while the UE is attached to the network. When the UE is in idle mode and MME needs to page the UE, the MME provides the eNB during S1 paging signalling with explicit IEs on the LC MTC capability of the UE and/or coverage enhanced mode. The eNB then performs according to the required capability (see FIG. 1 for the call flow).

Method 3: Capability Indication is Provided in RRC Container

When the UE perform RRC Connection establishment for the first time, it will provide its capability via RRC message and the mode via UE assistance information signalling. The eNB normally provides this capability container to the MME. Instead of keeping the capability in the existing UE capability container, eNB can extract the UE MTC capability and provide it in another container sent to the MME. The rationale behind this is that the container can be used not just for connected mode but also for idle mode. There is thus no need to provide the existing capability container for performing idle mode paging. The MME stores the capability while the UE is attached to the network. When the UE is in idle mode and MME needs to page the UE, the MME provides the eNB during S1 paging signalling with the new container on the LC MTC capability of the UE and/or coverage enhanced capability and mode. The eNB then performs according to the capability (see FIG. 2 for the call flow).

As mentioned, the LC MTC capability of the UE and its ability to support coverage enhanced mode is static and this can be provided as part of the UE subscription. In Option (b), the MME can retrieve such information from the HSS (home subscriber service) when the UE is registered with the network. In some cases the device will not be mobile and the coverage enhanced mode will also static, and this method can be used to transmit this information as well as the capability information. The eNB is provided with this information explicity via S1 paging signalling from the core network node or MME.

Alternatively, the information can be provided to the network via a combination of options (a) and (b). The LC MTC capability can be provided via Option (b) for example, while the enhanced coverage mode is provided via Option (a).

When the UE goes to connected mode it performs a handshake with and connects to a base station eNB of the network, the MME can again provide this information to the eNB as part of the S1 UE context for connected mode paging and other transmissions/receptions. Alternatively, the UE can provide this information via UE capability exchange again between the UE and the eNB.

FIG. 1 shows a wireless network communications system according to an embodiment of the present invention. This system comprises a plurality of base stations 20 which provide radio coverage in radio coverage cells 30. Some of these base stations 20 are configured to operate in a coverage enhanced mode where they provide an enhanced coverage cell 32 that extends the area of the coverage cells and allows the base station to communicate with user equipment located in high attenuation areas with low signals. The area shown as the enhanced coverage cell is an area that requires the enhanced coverage mode which uses the repetition of messages to improve communication. By such repetition information can be accumulated and decoded, even where it is hard to receive.

The core network has a network control node or mobility management entity (MME) which communicates with the base stations 20 and with the subscription service 16 which stores subscription information about the user equipment that has subscribed to use this network. Network control node to comprises a user equipment capability store that stores information on the capabilities of the different user equipment. This is stored in the form of paging property information which is sent along with paging instructions to the base stations that are to page the particular user equipment. It also comprises receiver/transmitter circuitry 14 for sending and receiving signals from the various base stations. These signals may be sent wirelessly or through wired links, or as a mixture of the two depending on the construction of the network.

User equipment 50 can operate in connected mode when it has performed a connection procedure with a local base station and has established a dedicated channel for communication with that base station, or in an idle mode where it is not connected to the wireless network. In idle mode, it still needs to be able to be contacted by the network such that if, for example, another user equipment wishes to contact it, or if there is information about the network that it needs to know, this information can be transmitted to it. For this reason, network control node to stores information about the location of user equipment in idle mode such that paging information can be transmitted to the appropriate base station. In this regard, as the user equipment it performs a tracking area update (TAU) procedure such that information on its new location is transmitted to the network control node to and can be stored therein.

Where the user equipment has particular properties that require particular signalling to enable it to be able to decode the signals, this information will also need to be stored at the network control node to in order for paging messages to be successfully received by the user equipment. For example, if the user equipment 50 is a low complexity or low cost device that has, for example, low buffer storage space, it can only communicate in reduced size transport blocks as it cannot buffer very much information. Network control node to needs to know this before it sends paging information. For this reason, network control node to will store this user equipment capability information in the paging property store 12 in the form of paging property information.

User equipment 50 may also support enhanced coverage mode, but in this case it may only support it when it is in an area requiring enhanced coverage and when the base station itself is operating in enhanced coverage mode. In this regard, enhanced coverage mode is provided to enable a user equipment that is located perhaps in an area of low signal penetration, perhaps in a basement signal to be able to communicate with the base station using repeated messaging. Thus, while the user equipment is in such a location and supports this mode of operation it needs to let the network control node know this, such that when paging messages are sent they are sent repeatedly and the user equipment 50 can accumulate multiple messages increasing its chances of decoding them successfully. In some embodiments, this information is sent using the tracking area update procedure such that user equipment monitors when it moves into and out of enhanced coverage mode areas and transmits this information to the network control node to which can therefore store this information alongside the information regarding its location and other paging property information such as it being a low complexity device if this is the case. In this regard the enhanced coverage mode information may be stored as a single indicator indicating whether or not the user equipment currently supports enhanced coverage mode, or as two indicators one indicating the capability of the user equipment to support coverage enhanced mode, a static property, and the other a dynamic mode indicator indicating whether the user equipment is currently in an area that supports this coverage enhanced mode. Clearly the dynamic indicator is only stored for user equipment that have the capability to support coverage enhanced mode.

For more static property information, such as it being a low complexity device, this may be provided as information on the device when the device subscribes to the network and, thus, it might be stored in the subscription information in HSS 16. In this case, this information is transmitted from HSS 16 to the network control node and is again stored as paging property information in data store 12. In this regard enhanced coverage capability could also be seen as a static property and this may also be provided via the HSS 16, with the ability to support enhanced mode coverage at a particular time being a dynamic property or mode of operation that may be changed and thus, may be sent in a different way such as via NAS signalling or in a radio resource connection signal.

Both the static capabilities and any mode information can alternatively and/or additionally be transmitted to the network control node when the user equipment initially connects to the network in perhaps an NAS signal or as part of the connection request procedure, either in a message that is directed to the network control node to or one directed to the base station which itself extracts this information and transmits it to the network control node for storage in the paging property information store 12. It should be noted that messages directed to the network control node are transmitted via the base station but in a transparent way, such that the base station simply transmits the message further.

Figure 2:
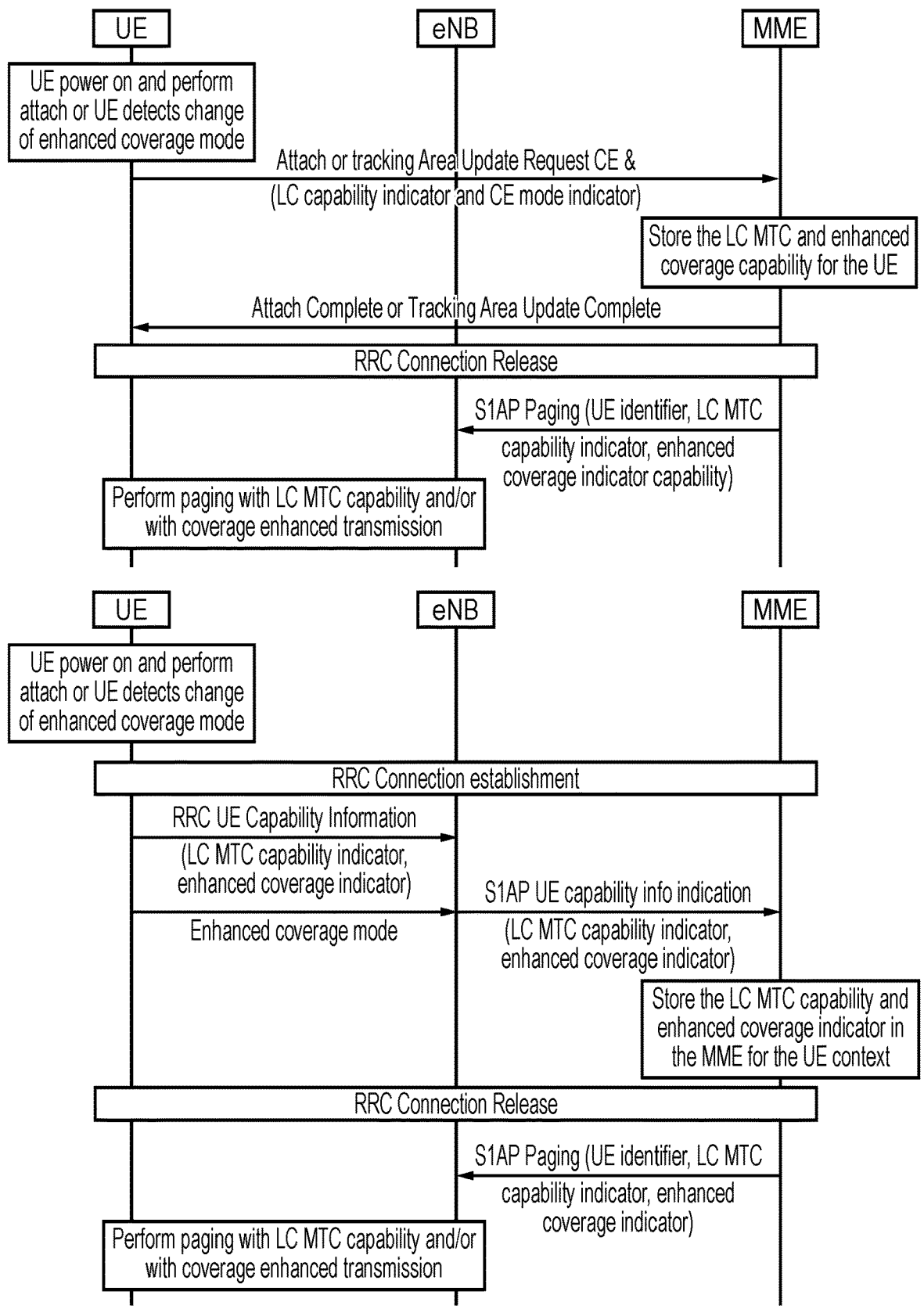
FIG. 2 shows a flow diagram illustrating steps in two methods for providing user equipment capability to a core network.

FIG. 2 shows one method of providing explicitly the low complexity MTC and/or the enhanced coverage mode capability and mode information to the MME. Looking at the top of the Figure, on power-on the user equipment performs the attach procedure and sends an attach request to the core network. This will be transmitted transparently via an eNB or base station, in a signal directed to the core network. Alternatively, when the UE detects a change in the enhanced coverage mode it may transmit a tracking area update request, again directed to the MME, indicating this. The MME will store the received information as paging property information and the attach or the tracking area update will complete. The UE will then at some later point release the connection to the MME and enter idle mode. Later, the MME will page the user equipment using the S1 application paging request and will include paging information such as a UE identifier, a low complexity capability indicator and an enhanced coverage indicator, which will indicate if the user equipment has enhanced coverage capability and is in an area requiring coverage enhanced mode. The base station will then be able to page the device using the appropriate signalling; that is, with a reduced transport size block if the device is a low complexity device, or using repeated transmissions if it requires coverage enhanced mode.

Looking at the flow diagram lower portion of FIG. 2, the UE powers-on and performs an attach procedure or detects a change in the enhanced coverage mode, as in the previous case. It then performs an RRC connection to connect to the network. During this connection it transmits its capability as part of the radio resource control (RRC) signalling. This includes low complexity and coverage enhanced mode capability information. It also transmits mode information in an assistance information signal as part of the RRC signalling and this includes the coverage enhanced mode indicator, which indicates if the user equipment is currently in an area requiring enhanced coverage. The base station transmits this information as an S1 paging message to the network control node MME which stores the capabilities and/or mode of the user equipment as paging property information. The device will then at some point release the connection and enter idle mode. When the MME wishes to page the user equipment it will use an S1 paging message in which the user equipment identifier and its capability/mode is included. The base station can then page the user equipment with the appropriate signalling, knowing its capabilities.

Figure 3:
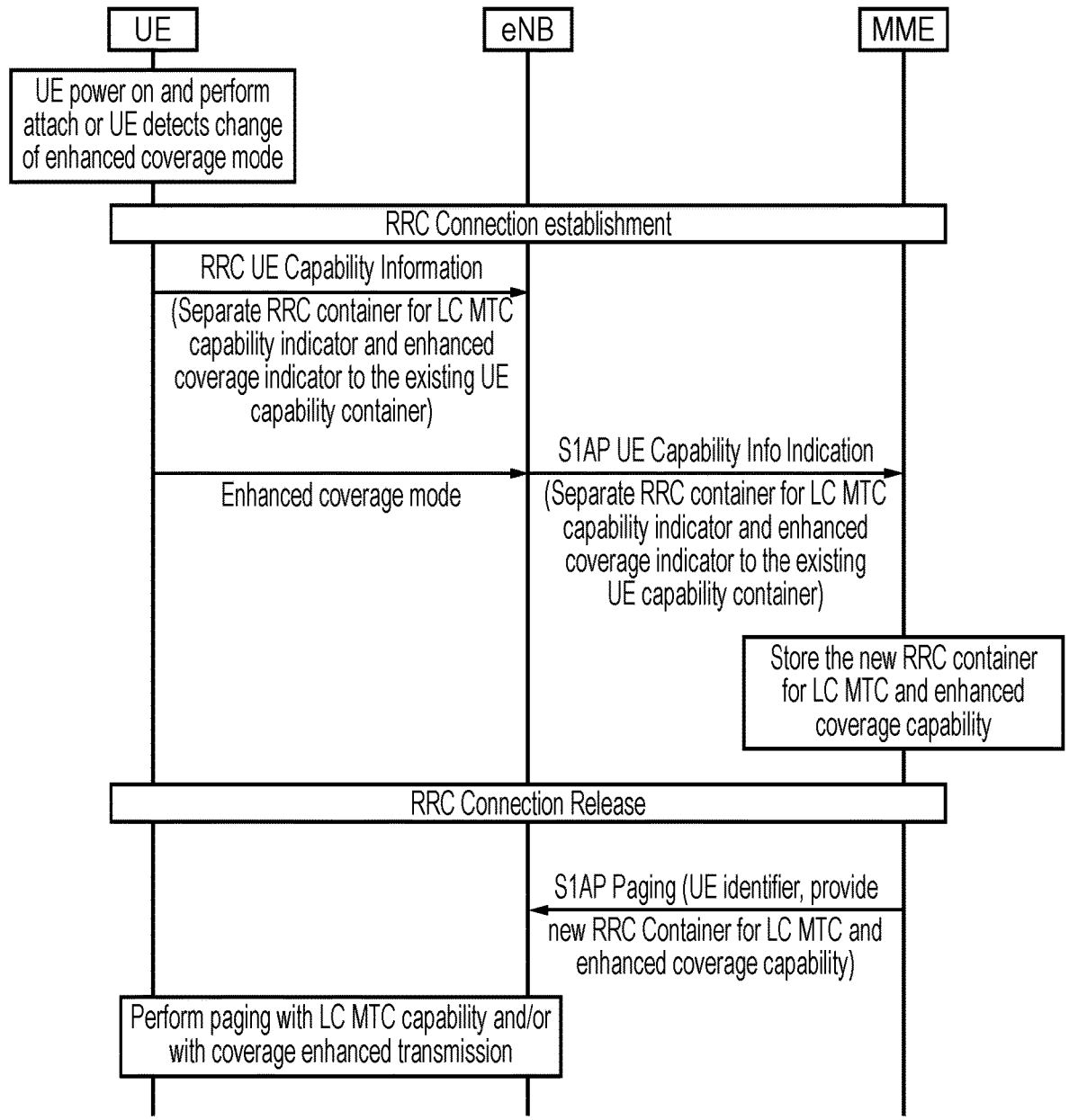
FIG. 3 shows a further method of providing user equipment capability to a core network.

FIG. 3 shows the provision of the LC capability and enhanced coverage mode capability provided in a separate RRC container to the existing RRC container that is used in idle mode paging.

Again, the method starts with the UE powering-on and performing an attach procedure or detecting a change in the enhanced coverage mode. An RRC connection is established and RRC capability information is transmitted to the base station which contains a separate RRC container for the low complexity MTC capability indicator and enhanced coverage capability indicator. An assistance signal is transmitted that contains a mode indicator indicating whether the enhanced coverage mode is currently required. The capability indicators may be transmitted separately to the existing UE capability container or they may be transmitted within it. This information is then transmitted in the two separate containers to the MME and these containers are stored separately in the MME. The general user equipment capability is simply transmitted as a block from the core network to the e-node B when a connection is required. However, for paging information this is required when the user equipment is in idle mode and, thus, storing it in a separate container allows the MME to access this and transmit it along with the paging request to the appropriate base station when paging is required.

Once the UE has released the connection to the network and is in idle mode then the MME may wish to page it and will transmit an S1 paging message which identifies the UE and provides the new RC container that has the LC MTC and enhanced coverage capability and mode information within it. This allows the base station, in this case an eNB, to perform paging with the appropriate capabilities.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Although illustrative embodiments of the invention have been disclosed in detail herein with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. A method comprising:
receiving, at a network control node relayed from at least one of a plurality of base stations, a static indication as to whether a user equipment supports a coverage enhanced mode utilizing repetition of some messaging to increase coverage;
receiving, at the network control node relayed from the at least one plurality of base stations, a dynamic indication as to whether the user equipment is currently in an area requiring the coverage enhanced mode that utilises repetition of some messaging to increase coverage,
storing said static and dynamic indications as paging property information for said user equipment at said network control node; and
transmitting said paging property information to at least one of said base stations when instructing paging of said user equipment that is currently in idle mode.

2. The method according to claim 1, further comprising:
receiving at said network control node from said at least one base station, user equipment capability information including an indication from said user equipment as to whether said user equipment supports said coverage enhanced mode;
storing said coverage enhanced mode indications as paging property information for said user equipment at said network control node; and
transmitting said paging property information to at least one of said base stations when instructing paging of said user equipment that is currently in idle mode.

3. The method according to claim 1, further comprising:
receiving at said network control node from said at least one base station, user equipment capability information including low complexity identification information identifying said user equipment as a low complexity user equipment; and
storing said low complexity identification information identifying said user equipment as a low complexity user equipment as paging property information for said user equipment at said network control node.

4. The method of claim 1, wherein the storing said dynamic indication is only performed when the said static indication indicates the user equipment supports said coverage enhanced mode.

5. An apparatus comprising:
at least one processor; and
at least one memory including computer program code;
the at least one memory and the computer program code configured to, with the at least one processor, cause the apparatus at least to perform:
receiving, relayed from at least one of a plurality of base stations a static indication as to whether a user equipment supports a coverage enhanced mode requiring utilising repetition of some messaging to increase coverage, receive, relayed from the at least one of the plurality the base stations, a dynamic indication as to whether the user equipment is currently in an area requiring said coverage enhanced mode utilising repetition of some messaging to increase coverage, store said static and dynamic indications as paging property information for said user equipment, and transmit said paging property information to at least one of said base stations when instructing paging of said user equipment that is currently in idle mode.

6. The apparatus according to claim 5, wherein the at least one memory and the computer program code are configured to, with the at least one processor, cause the apparatus to perform:

receiving at a network control node from at least one of said base stations, user equipment capability information including an indication from said user equipment as to whether said user equipment supports said coverage enhanced mode;

storing said coverage enhanced mode indications as paging property information for said user equipment at said network control node; and transmitting said paging property information to at least one of said base stations when instructing paging of said user equipment that is currently in idle mode.

7. The apparatus according to claim 5, wherein the at least one memory and the computer program code are configured to, with the at least one processor, cause the apparatus to perform:

receiving at a network control node from at least one of said base stations, user equipment capability information including low complexity identification information identifying said user equipment as a low complexity user equipment; and storing said low complexity identification information identifying said user equipment as a low complexity user equipment as paging property information for said user equipment at said network control node.

8. The apparatus of claim 5, wherein the storing said dynamic indication is only performed when the said static indication indicates the user equipment supports said coverage enhanced mode.

9. A method comprising:

receiving, at a network control node relayed from at least one of a plurality of base stations, a static indication of static information as to whether a user equipment supports a coverage enhanced mode that utilises repetition of some messaging to increase coverage, based on whether the user equipment supports the coverage enhanced mode, receiving, at the network control node relayed from the at least one of the plurality of base stations, dynamic indication of dynamic information as to whether the user equipment is currently in an area requiring the coverage enhanced mode;

in response to the static indication indicating that the user equipment supports the coverage enhanced mode, storing said static and indications as paging property information for said user equipment at said network control node; and transmitting said paging property information to at least one of said base stations when instructing paging of said user equipment that is currently in idle mode.

10. The method of claim 9, wherein the storing said dynamic indication is only performed when the said static indication indicates that the user equipment supports the coverage enhanced mode.

11. An apparatus comprising:

at least one processor; and at least one memory including computer program code;

the at least one memory and the computer program code configured to, with the at least one processor, cause the apparatus at least to perform:

receive, at a network control node relayed from at least one of a plurality of base stations, a static indication of static information as to whether a user equipment supports a coverage enhanced mode that utilises repetition of some messaging to increase coverage, based on whether the user equipment supports the coverage enhanced mode, receiving at the network control node relayed from the at least one of the plurality of base stations a dynamic indication of dynamic information as to whether the user equipment is currently in an area requiring the coverage enhanced mode, in response to the static indication indicating that the user equipment supports the coverage enhanced mode, store said static and dynamic indications as paging property information for said user equipment at said network control node, and transmit said paging property information to at least one of said base stations when instructing paging of said user equipment that is currently in idle mode.

12. The apparatus of claim 11, wherein the storing said dynamic indication is only performed when the said static indication indicates that the user equipment supports the coverage enhanced mode.

\* \* \* \* \*